United States Patent
Bixel (10) Patent No.: US 7,511,446 B2
(45) Date of Patent: Mar. 31, 2009

(54) SYSTEM AND METHOD FOR STARTING A WOUND ROTOR MOTOR

(75) Inventor: Paul S. Bixel, Salem, VA (US)

(73) Assignee: TM GE Automation Systems LLC, Roanoke, VA (US)

( * ) Notice: Subject to any disclaimer, the term of this patent is extended or adjusted under 35 U.S.C. 154(b) by 0 days.

(21) Appl. No.: 11/576,576

(22) PCT Filed: Aug. 5, 2005

(86) PCT No.: PCT/US2005/027802

§ 371 (c)(1),
(2), (4) Date: Apr. 3, 2007

(87) PCT Pub. No.: WO2007/018537

PCT Pub. Date: Feb. 15, 2007

(65) Prior Publication Data

US 2007/0278985 A1     Dec. 6, 2007

Related U.S. Application Data

(63) Continuation-in-part of application No. PCT/US2005/016862, filed on May 13, 2005.

(51) Int. Cl.
*H02P 1/26* (2006.01)
*H02M 5/458* (2006.01)

(52) U.S. Cl. ........................ 318/778; 318/732; 318/785; 318/786; 318/783; 363/34; 363/37

(58) Field of Classification Search ................ 318/732, 318/778, 801, 785, 786; 363/16, 34, 37; 320/101, 148; 701/22; 307/64, 66
See application file for complete search history.

(56) References Cited

U.S. PATENT DOCUMENTS

| | | | |
|---|---|---|---|
| 4,511,835 A | | 4/1985 | Studtmann |
| 4,567,420 A | | 1/1986 | Beck |
| 4,724,503 A | | 2/1988 | Libert |
| 4,764,713 A | | 8/1988 | D'Atre et al. |
| 5,017,800 A | * | 5/1991 | Divan ........................ 307/66 |
| 5,473,241 A | | 12/1995 | Chen et al. |
| 5,714,851 A | * | 2/1998 | Antony et al. ............... 318/148 |
| 5,905,642 A | | 5/1999 | Hammond |
| 6,255,008 B1 | * | 7/2001 | Iwase ........................ 429/9 |
| 6,295,215 B1 | * | 9/2001 | Faria et al. ................... 363/37 |
| 6,762,945 B2 | * | 7/2004 | Morgen ...................... 363/17 |
| 6,906,933 B2 | * | 6/2005 | Taimela ...................... 363/37 |
| 6,917,124 B2 | * | 7/2005 | Shetler et al. ................. 307/66 |
| 7,076,304 B2 | * | 7/2006 | Thompson ................... 607/33 |
| 2003/0048006 A1 | * | 3/2003 | Shelter et al. ................. 307/64 |
| 2004/0084965 A1 | * | 5/2004 | Welches et al. ............... 307/64 |

(Continued)

*Primary Examiner*—Paul Ip
(74) *Attorney, Agent, or Firm*—Peter E. Rosden; Woods Rogers PLC (57) ABSTRACT

A system and method for starting and regulating a wound rotor motor (320) including a phase-controlled SCR converter (350) and a drive circuit (330, 340) having a voltage source inverter (340) and a voltage source converter (330). The SCR converter (350) regulates power transmitted to the drive circuit from the rotor of the motor so that the ratings of the drive circuit are not exceeded. A shorting contactor (390) is employed in various embodiments to increase the efficiency of the circuit.

18 Claims, 6 Drawing Sheets

U.S. PATENT DOCUMENTS

| | | |
|---|---|---|
| 2004/0085785 A1* | 5/2004 | Taimela ..................... 363/37 |
| 2004/0155526 A1 | 8/2004 | Naden et al. |
| 2004/0164716 A1 | 8/2004 | Walter et al. |
| 2004/0199213 A1* | 10/2004 | Thompson ................. 607/35 |
| 2005/0035664 A1* | 2/2005 | Zver et al. ................. 307/115 |
| 2005/0083009 A1* | 4/2005 | Niiranen ..................... 318/778 |
| 2008/0024087 A1* | 1/2008 | Bixel ........................ 318/783 |
| 2008/0051949 A1* | 2/2008 | Seo et al. ..................... 701/22 |
| 2008/0157529 A1* | 7/2008 | Rivas et al. ................. 290/44 |
| 2008/0224652 A1* | 9/2008 | Zhu et al. .................. 320/101 |
| 2008/0273353 A1* | 11/2008 | Rumpf ........................ 363/15 |

* cited by examiner

SYSTEM AND METHOD FOR STARTING A WOUND ROTOR MOTOR

CROSS-REFERENCES TO RELATED APPLICATIONS

This application is a continuation-in-part of PCT/US2005/016862, filed on May 13, 2005, which is incorporated herein by reference in its entirety.

TECHNICAL FIELD

The subject invention relates generally to a system and method for starting a wound rotor motor used in industrial applications. More particularly, the system and method provide an economical and efficient starting circuit for such a motor by arranging conventionally known components in a novel configuration.

BACKGROUND OF THE INVENTION

A wound rotor motor (WRM) can be controlled using a voltage source inverter (VSI) in combination with a voltage source converter (VSC) so that variable motor speed and torque are obtained. An advantage of a this type of system is that only a fraction of the power delivered by the motor to the shaft which it drives must be handled by the drive system, i.e. the VSI/VSC combination. This is a desirable feature since the cost of the drive system is proportional to its capacity.

Figure 1:
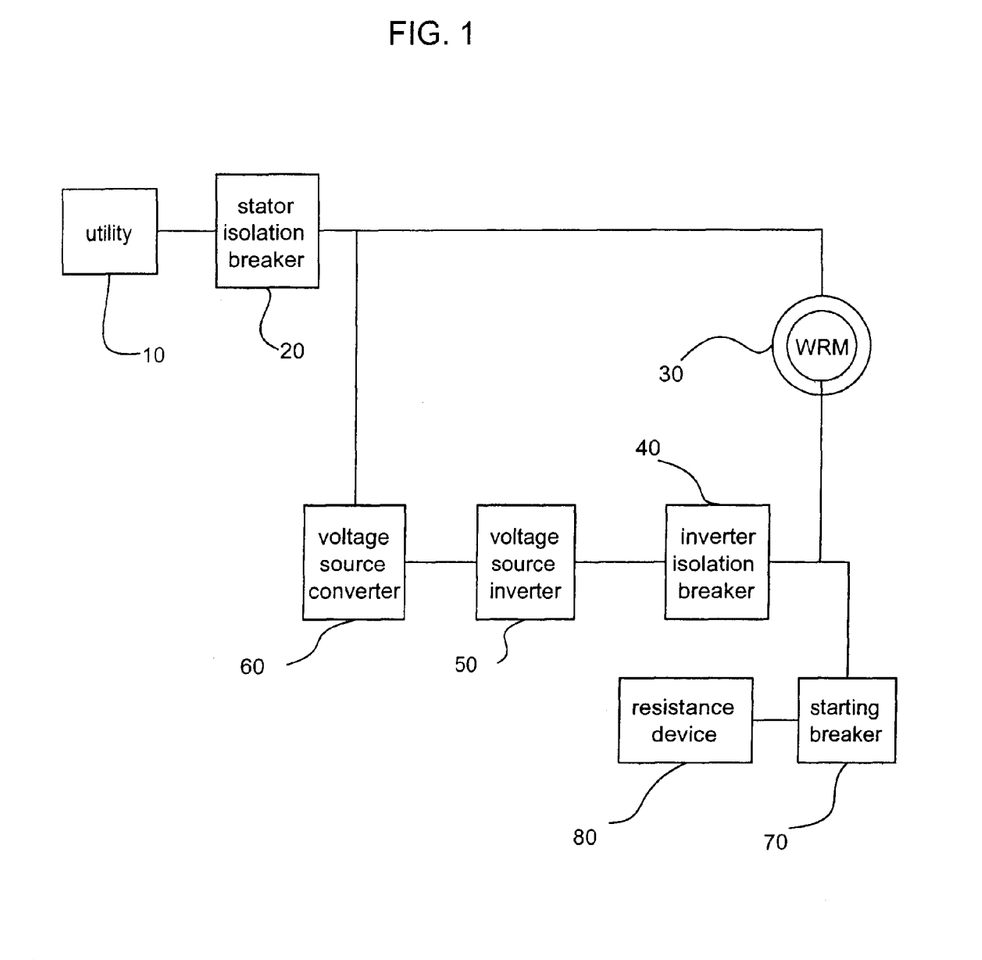
FIG. 1 is a block diagram of the components of a conventional motor starting circuit.

However, in order to operate under VSI control a WRM must first be started and brought from inactivity to some speed so that the rotor voltage does not exceed the voltage ratings of the drive system. In the prior art, this has been achieved by reliance on expensive starting resistors and contactors. FIG. 1 illustrates such a conventional system where power is supplied from a utility at 10 through a stator isolation breaker 20 connected to the stator of a motor 30. Some power flows out of the rotor of motor 30 during starting when torque is required at the motor shaft and voltage is blocked by inverter isolation breaker 40 from reaching the motor drive elements formed by conventional VSI 50 and conventional VSC 60. Instead, this power is diverted through starting breaker 70 to resistance means 80, which can, for example, be a liquid rheostat or other similarly functioning device, and is dissipated there in the form of heat. When the speed of motor 30 has accelerated to the point that the rotor voltage no longer exceeds the ratings of the VSI 50 breaker 70 opens and inverter isolation breaker 40 closes and the motor continues operation under the control of the VSI 50. The point at which the transition from resistance means 80 to VSI 50 operation defines the minimum operating speed of the system under VSI 50 control.

The power requirement of the motor drive elements is governed by the power generated along the rotor circuit. This can be understood by using the following well-known equations:

$$P_{ag} = T \times W_s$$

$$P_m = T \times W_m$$

$$P_{rot} = P_{ag} - P_m$$

where the rotor circuit power ($P_{rot}$) equals the difference between the air gap power ($P_{ag}$) and the mechanical power ($P_m$). The air gap power ($P_{ag}$) is determined by the product of the shaft torque (T) times the power utility frequency along the mains ($W_s$), while the mechanical power ($P_m$) is determined by the product of the shaft torque (T) and the mechanical speed ($W_m$). From these equations, it becomes clear that slow motor speed and high torque, which can be the case at starting, can lead to high rotor circuit power. As a result, the conventional arrangement in FIG. 1 was developed to prevent the power capability of the VSI and VSC drive elements from being exceeded during starting when the speed of the motor is low and torque demands are high. However, this protection is achieved by means of inclusion in the starting circuit of expensive and bulky resistance and breaker devices.

What is needed is a more efficient and economical way to achieve this same goal by making the resistance and breaker components superfluous and eliminating them.

SUMMARY OF THE INVENTION

This invention relates to a system and method for starting and regulating an AC powered wound rotor motor. In one embodiment, the system includes a phase-angle controlled silicon controlled rectifier converter (SCRC) connected at its input to the rotor of the motor. A shorting contactor bridges the input and the output of the SCRC. The output of the SCR converter is further connected to a drive circuit having a voltage source inverter (VSI) and a voltage source converter (VSC). The input of the VSI is connected to the output of the SCRC, while the output of the VSI is connected to the input of the VSC. The output of the VSC feeds back into the AC line circuit which is connected to the stator of the motor. In one embodiment of the method of the invention, AC power is supplied to the stator of the motor. The power produced at the rotor of the motor is delivered to the SCRC which regulates the amount of such power which is transferred to the drive circuit by adjusting the gating of its silicon controlled rectifiers in response to a phase angle signal. The SCRC is designed so that the ratings of the drive circuit components are not exceeded during starting of the motor. In a second embodiment, the shorting contactor is connected between the rotor of the motor and the input of the VSI, while the input of the SCRC is also connected to the rotor of the motor and the output of the SCRC is connected to the output of the VSI. Thus, the VSI in the drive circuit of the second embodiment is isolated by the shorting contactor until voltage is below a pre-specified level.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 2:
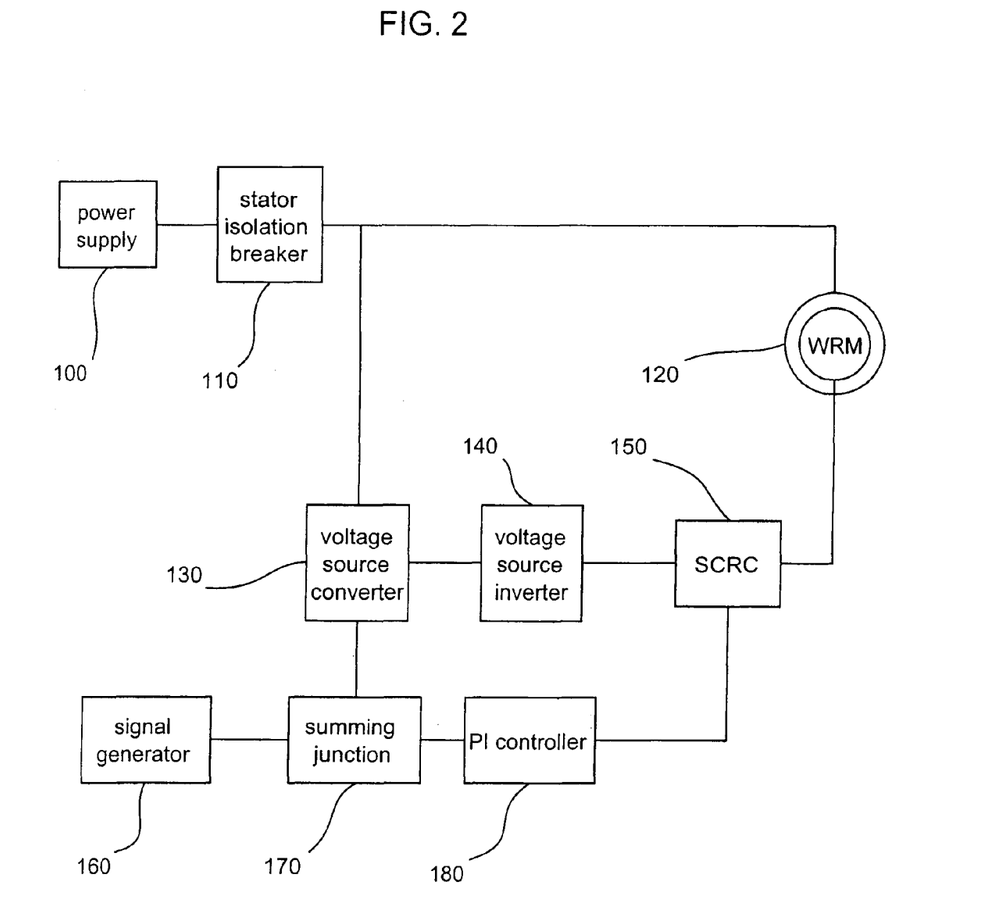
FIG. 2 is a block diagram of the components of the starting circuit of this invention.

For a more detailed understanding of the invention, reference is first made to FIG. 2 of the drawings which presents a block diagram view of the components in the preferred embodiment of the starting circuit of this invention. As in FIG. 1, power is provided from a power supply 100, such as a utility mains, generator or any other source of AC power, through a protective stator isolation breaker 110 to a wound rotor motor 120. Typically, three phase power is provided in such a system although other arrangements are possible depending on specific system requirements. Stator isolation breaker 110 provides thermal protection of the motor circuit, allows for disconnection of the motor and drive elements for maintenance and provides protection against short circuit faults anywhere in the system.

The drive elements include VSC 130 and VSI 140. VSC 130 is an isolated gate bipolar transistor (IGBT)-based DC/AC power supply and is connected through an AC bus to stator isolation breaker 110. It controls the voltage of the DC bus connecting VSC 130 to VSI 140. VSC 130 can cause power to flow in either direction to maintain the DC bus voltage at a required setting and has ratings based on its design which may not be exceeded. The term ratings refers, for the purpose of this invention, to the maximum power, current and voltage handling capability of a particular component. The cost of VSC 130 is directly proportional to its ratings, so keeping the rated power as low as possible is a desirable objective. In certain designs where a particularly large power rating is required, VSC 130 may be comprised of several voltage source controllers connected in parallel in order to achieve the desired power rating. VSI 140 is also an IGBT-based power supply. It is similar in design to VSC 130 and also has ratings based on its design, but it controls motor torque rather than a DC voltage bus. VSC 130 and VSI 140 are conventional elements similar to VSC 60 and VSI 50. VSI 140 is coupled to an AC bus connected to a phase control silicon controlled rectifier converter (SCRC) 150.

SCRC 150 is comprised of at least four SCR's connected in two or more anti-parallel arrangements as described further below with reference to FIGS. 3 and 4. Moreover, each SCR within SCRC 150 may be further comprised of a block of one or more SCR's connected in parallel. SCRC 150 is initially in an "off" state and is gradually turned to a fully "on" state in response to a phase angle signal. Control of SCRC 150 may be exerted in a number of ways. For example, in the preferred embodiment, a power reference signal is provided by signal generator 160 which is a programmable logic circuit (PLC) or any other type of controller capable of the same function and may be powered either by the circuit of this invention or independently. The reference signal is typically generated after stator isolation breaker 110 is closed although an overriding multi-system control could be implemented providing for independent generation of such a signal. The signal so generated is delivered to summing junction 170 together with a feedback power signal from VSC 130. The feedback signal is subtracted from the reference signal to produce an error signal. This error signal is transmitted to a conventional proportional-integral (PI) controller 180 which uses that signal to generate a phase angle signal for transmission to and control of SCRC 150. Alternatively, SCRC 150 could be controlled solely through the use of a linear phase ramp in which the phase angle reference to SCRC 150 is linearly advanced with time and PLC 160, summing junction 170 and PI controller 180 are unnecessary. Thus, incorporation of SCRC 150 results in the elimination in a motor starting circuit of the need for inverter isolation breaker 40, starting breaker 70 and resistance means 80 as known in the prior art.

Figure 3:
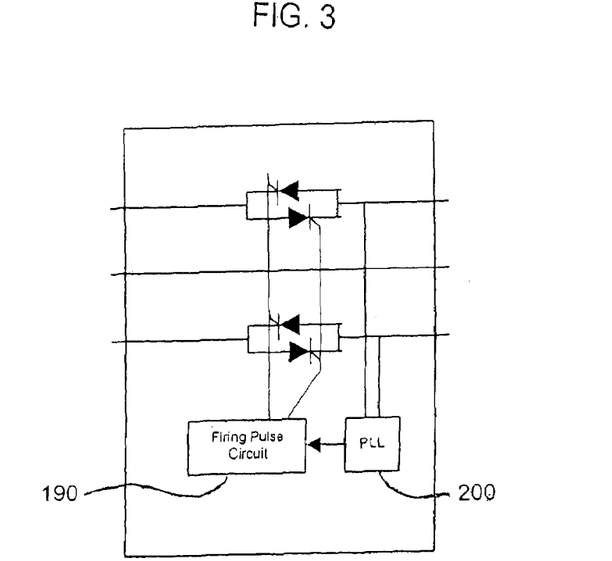
FIG. 3 is an illustration of a phase controlling SCR comprised of four SCR's.
Figure 4:
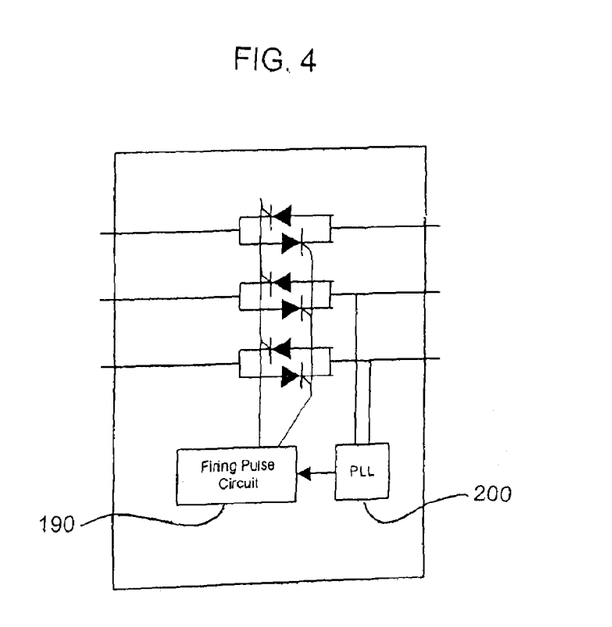
FIG. 4 is an illustration of a phase controlling SCR comprised of six SCR's.

FIGS. 3 and 4 illustrate various plural SCR configurations of SCRC 150. FIG. 3 illustrates SCRC 150 configured with four SCR's in a three phase anti-parallel arrangement. Operation of the SCR's is governed by conventional firing pulse circuit 190 which is itself controlled by conventional phase locked loop circuit 200 acting in response to the phase angle signal received from PI controller 180. FIG. 4 illustrates SCRC 150 configured with six SCR's in a three phase anti-parallel arrangement and also incorporating a firing pulse circuit 190 and a phase-locked loop circuit 200 both of which function as described with regard to FIG. 3. Again, it should be noted that each SCR shown may itself be comprised of a multiplicity of SCR's connected in series and parallel in order to achieve the required voltage and current rating.

In order to effectively use the primary method of this invention, motor 120 must be "off", in other words, have no rotation. SCRC 150 functions as a switch which, at this point, is also in the "off" position with all SCR gates open so that no rotor current flows and no torque is generated at the motor shaft. In order to start the motor, stator isolation breaker 110 is closed so that utility mains 100 can deliver voltage and current to motor 120. The degree to which SCRC 150 is turned "on" depends on the load and inertia on the particular system in which SCRC 150 is being used, the resultant torque developed by motor 120 and the power rating of VSC 130. The maximum torque as a function of a motor's speed can be stated as:

$$T = P_{rot}/(Ws - Wm)$$

where $P_{rot}$ is the rated power of VSC 130, $W_s$ is the power utility frequency along the mains and $W_m$ is the mechanical speed of the motor. Thus, when the speed is low during starting, minimal or no power is delivered to VSC 130 as SCRC 150 is either "off" or only partially "on" and generated rotor power is returned back to the line rather than being dissipated in resistance means 80 as in the prior art. During this starting mode, VSI 140 is also off and power is rectified inherently by the diodes in its IGBT-based devices. By gradually increasing the output of SCRC 150 in response to phase angle signals transmitted by PI 180, torque from motor 120 does not exceed the ratings of VSC 130. The initial power reference signal generated by signal generator 160 is based on the process requirement for acceleration and the capability of VSC 130 to handle output from the motor rotor based on its ratings. Eventually, the mechanical speed of the motor rises to the point where the rotor voltage is within the ratings of VSI 140, and SCRC 150 is effectively completely "on", which is to say that it is no longer controlled but is just locked in the gated on position and left in that position.

Alternatively, the method of this invention could also be adapted to and implemented in a variety of situations such as, for example, if power to motor 120 were lost during its operation resulting in a speed reduction significant enough to warrant the reintroduction of protection of the drive circuit by SCRC 150 until voltage from the rotor circuit of motor 120 falls to a level where it does not exceed the rating of VSI 140. In this situation, in response to an altered feedback power signal from VSC 130, PI controller 180 would generate a new phase angle signal for transmission to SCRC 150 which would effectively cause SCRC 150 to unlock from the gated position and either partially or completely turn off, as required by the situation. Other scenarios requiring protective intervention by SCRC 150 could also be envisioned.

Figure 5:
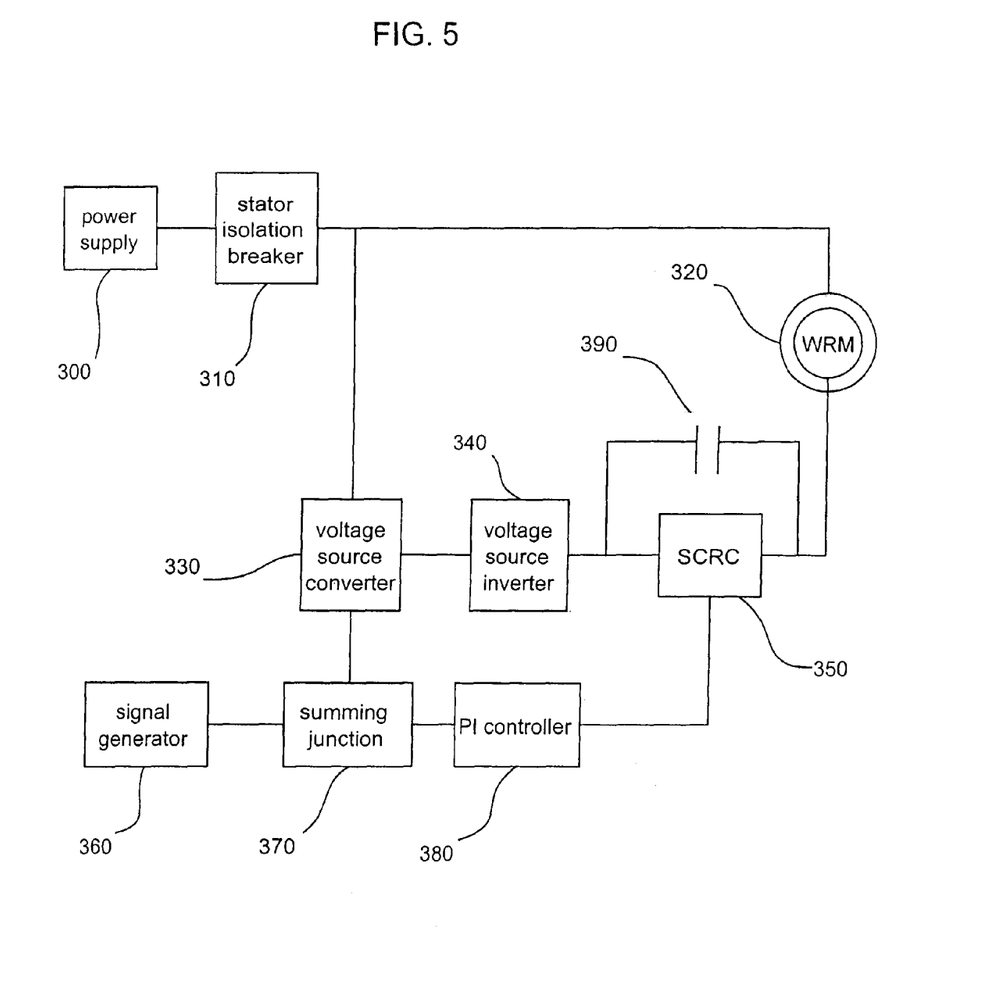
FIG. 5 is a block diagram of the components of a first alternative embodiment of the starting circuit of this invention.

FIG. 5 illustrates another embodiment of this invention. The elements of this embodiment correspond with one addition to those shown in FIG. 2. Thus, this circuit includes a three-phase power supply 300, stator isolation breaker 310, wound rotor motor 320, VSC 330, VSI 340, phase control silicon controlled rectifier converter (SCRC) 350, signal generator 360, summing junction 370 and proportional-integral (PI) controller 380, all arranged as in FIG. 2. However, this circuit also includes shorting contactor 390 which has appropriate specifications to function with the other elements of this circuit and which bridges from the input to the output of SCRC 350. Once SCRC 350 reaches its fully on state, as described with regard to FIG. 2, shorting contactor 390 is engaged, but it remains in an "off" state at all other times. After SCRC 350 reaches its fully on state, motor 320 is controlled by a pulse width modulator (PWM) which is not the subject of this invention. The advantage of this arrangement is that it results in lower losses after motor 320 is operating under PWM control since the voltage drop across SCRC 350 when it is fully on is higher than the losses across shorting contactor 390. Thus, this circuit provides higher efficiency in exchange for introducing the cost of an extra element, shorting contactor 390, into the circuit.

Figure 6:
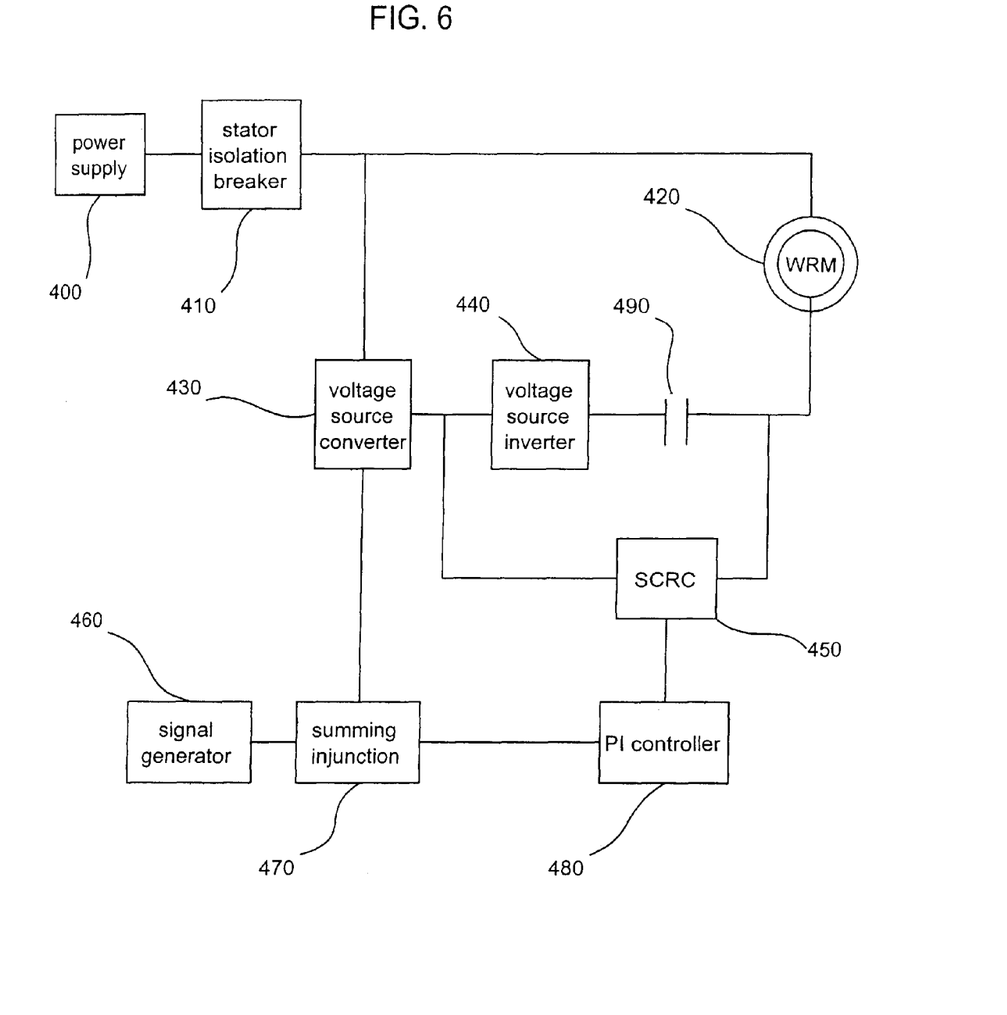
FIG. 6 is a block diagram of the components of a second alternative embodiment of the starting circuit of this invention.

FIG. 6 illustrates still another embodiment of this invention. The elements of this embodiment also correspond to those shown in FIG. 2 with one addition but are also arranged somewhat differently. Thus, this circuit includes a three-phase power supply 400, stator isolation breaker 410, wound rotor motor 420, VSC 430, VSI 440, phase control silicon controlled rectifier converter (SCRC) 450, signal generator 460, summing junction 470 and proportional-integral (PI) controller 480. However, in this arrangement shorting contactor 490, which has appropriate specifications to function with the other elements of this circuit, is connected between the rotor of motor 420 and the input of VSI 440, while the input of SCRC 450 is connected to the rotor of motor 420 and the output of SCRC 450 is connected to the DC bus of VSI 440. The difference in this embodiment is that SCRC 450 rectifies rotor power from the rotor of motor 420 directly to the DC bus of VSI 440 rather than through the diodes of a PWM inverter as was the case for FIGS. 2 and 5 Shorting contactor 490 is mandatory under these circumstances in order to keep the VSI 440 isolated from the rotor circuit until the voltage is below a specified level. SCRC 450 is controlled in exactly the same manner as is SCRC 150 in the circuit of FIG. 2. When motor 120 comes under PWM control, shorting contactor 490 is closed and SCRC 450 is turned off. As with the previously discussed embodiment, this circuit arrangement results in increased efficiency at the cost of adding an extra component to the circuit.

Figure 7:
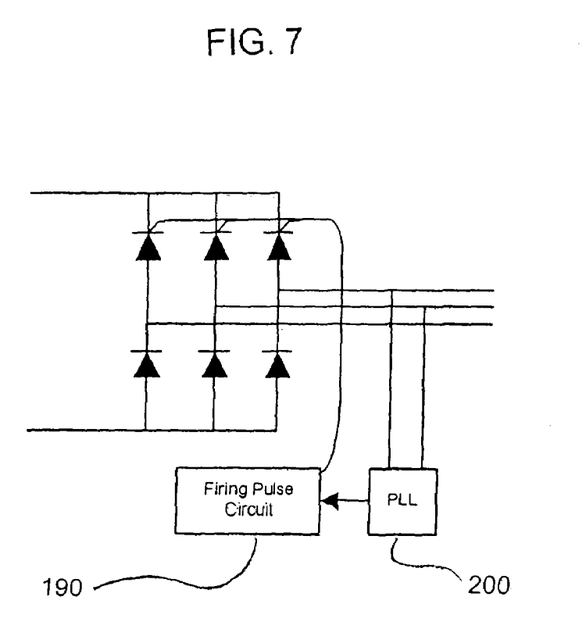
FIGS. 7 and 8 illustrate alternative embodiments of the silicon controlled rectifier converter necessary for use with the embodiment of FIG. 6.
Figure 8:
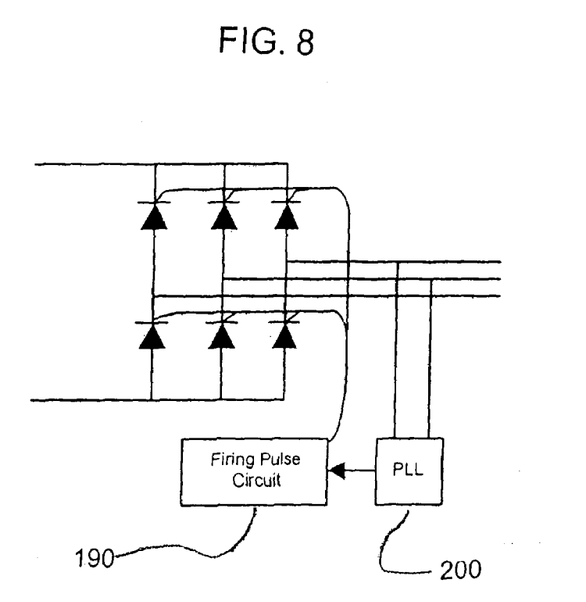

FIGS. 7 and 8 illustrate embodiments of the SCRC which are compatible with the embodiment of FIG. 6. This SCRC is different in that it connects an AC bus to a DC bus rather an AC bus to AC bus as shown in FIGS. 3 and 4. FIG. 7 illustrates an SCRC having three SCR's and three diodes, as well as a firing pulse circuit 190 and a phase locked loop circuit 200. Each SCR is connected in series with a diode to form a pair, and each pair is connected in parallel with other pairs in the SCRC. FIG. 8 illustrates an SCRC having six SCR's, as well as a firing pulse circuit 190 and a phase locked loop circuit 200. Each SCR is connected in series with another SCR to form a pair, and each pair is connected in parallel with other pairs in the SCRC. A larger number of pairs of SCR's alone and SCR's and diodes, respectively, could be used in either of the embodiments of FIGS. 7 and 8.

The foregoing invention has been described in terms of the preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A system exclusively for starting and regulating a wound rotor motor having a stator connected by an AC bus to an AC power source comprising:
   a phase-angle controlled silicon controlled rectifier converter having an input and an output, the input of which is connected to the rotor of the motor;
   a voltage source inverter having an input and an output, the input of which is connected to the output of said converter;
   a voltage source converter having an input and an output, the input of which is connected by a bidirectional constant voltage DC bus to the output of said inverter and the output of which is connected to the AC bus; and
   a shorting contactor connected between the input and the output of said rectifier converter.

2. A system exclusively for starting and regulating a wound rotor motor having a stator connected by a first AC bus to an AC power source comprising:
   a silicon controlled rectifier converter having two inputs and an output, the first input of which is connected to the rotor of the motor by a second AC bus;
   a shorting contactor connected between the first input and the output of said rectifier converter;
   a voltage source inverter having an input and an output, the input of which is connected by a third AC bus to the output of said silicon controlled rectifier converter;
   a voltage source converter having an input and two outputs, the input of which is connected by a bidirectional constant voltage DC bus to the output of said voltage source inverter and the first output of which is connected to the first AC bus;
   a signal generator having an output;
   a summing junction having two inputs and one output, connected at the first input to the output of said signal generator and at the second input to the second output of said voltage source converter; and
   a proportional-integral controller having an input and an output, the input of which is connected to said summing junction and the output of which is connect to the second input of said silicon controlled rectifier converter.

3. A system exclusively for starting and regulating a wound rotor motor having a stator connected by a first AC bus to an AC power source comprising;
   a silicon controlled rectifier converter having two inputs and an output, the first input of which is connected to the rotor of the motor by a second AC bus;
   a shorting contactor connected between the first input and the output of said rectifier converter;
   a voltage source inverter having an input and an output, the input of which is connected by a third AC bus to the output of said silicon controlled rectifier converter;
   a voltage source converter having an input and an output, the input of which is connected by a bidirectional constant voltage DC bus to the output of said voltage source inverter and the output of which is connected to the first AC bus; and
   a linear phase ramp connected to the second input of said silicon controlled rectifier converter.

4. A method exclusively for starting and regulating a wound rotor motor with an AC power source line using a drive circuit having both a voltage source converter with specified ratings, at least one output and an input connected to the output of a voltage source inverter with specified ratings wherein a first input of a silicon controlled rectifier converter having at least one silicon controlled rectifier is connected to the rotor of the motor and the output of the silicon controlled rectifier converter is connected to the input of the voltage source inverter and wherein further a shorting contactor is connected between one input and the output of the silicon controlled rectifier converter and the gating of the at least one rectifier is adjustable, comprising:

supplying AC power to the stator of the motor;

delivering AC power generated by the rotor of the motor to the silicon controlled rectifier converter;

generating a phase angle control signal;

transmitting the phase angle control signal to the silicon controlled rectifier converter through a second input thereof;

adjusting the gating of the at least one silicon controlled rectifier in response to the phase angle control signal such that the output of the silicon controlled rectifier converter does not exceed the ratings of either the voltage source converter or the voltage source inverter;

shunting power to a shorting contactor after the at least one silicon controlled rectifier has reached a fully on state; and returning rotor power passed through to the voltage source converter back to the AC power source line.

5. A system exclusively for starting and regulating a wound rotor motor having a stator connected by an AC bus to an AC power source comprising:

a shorting contactor having an input and an output, the input of which is connected to the rotor of the motor;

a voltage source inverter having an input and an output, the input of which is connected to the output of said shorting contactor;

a voltage source converter having an input and an output, the input of which is connected by a bidirectional constant voltage DC bus to the output of said inverter and the output of which is connected to the AC bus; and a phase-angle controlled silicon controlled rectifier converter having an input and an output, the input of which is connected to the rotor of the motor and the output of which is connected to the input of said voltage source converter.

6. The system of claim 5 wherein said rectifier converter is further comprised of at least three pairs of components, each pair having a silicon controlled rectifier connected in series with another silicon controlled rectifier and each pair being connected in parallel with the other pairs.

7. The system of claim 6 wherein said silicon controlled rectifiers are regulated by a phase-locked loop controlling a firing pulse circuit.

8. The system of claim 5 wherein said rectifier converter is further comprised of at least three pairs of components, each pair having a silicon controlled rectifier connected in series with a diode and each pair being connected in parallel with the other pairs.

9. The system of claim 8 wherein said silicon controlled rectifiers are regulated by a phase-locked loop controlling a firing pulse circuit.

10. A system exclusively for starting and regulating a wound rotor motor having a stator connected by a first AC bus to an AC power source comprising:

a shorting contactor having an input and an output, the input of which is connected to the rotor of the motor;

a voltage source inverter having an input and an output, the input of which is connected to the output of said shorting contactor;

a silicon controlled rectifier converter having two inputs and an output, the first input of which is connected to the rotor of the motor by a second AC bus and the output of which is connected to the output of said voltage source inverter;

a voltage source converter having an input and two outputs, the input of which is connected by a bidirectional constant voltage DC bus to the output of said voltage source inverter and the first output of which is connected to the first AC bus;

a signal generator having an output;

a summing junction having two inputs and one output, connected at the first input to the output of said signal generator and at the second input to the second output of said voltage source converter; and a proportional-integral controller having an input and an output, the input of which is connected to said summing junction and the output of which is connected to said silicon controlled rectifier converter.

11. The system of claim 10 wherein said rectifier converter is further comprised of at least three pairs of components, each pair having a silicon controlled rectifier connected in series with another silicon controlled rectifier and each pair being connected in parallel with the other pairs.

12. The system of claim 11 wherein said silicon controlled rectifiers are regulated by a phase-locked loop controlling a firing pulse circuit.

13. The system of claim 10 wherein said rectifier converter is further comprised of at least three pairs of components, each pair having a silicon controlled rectifier connected in series with a diode and each pair being connected in parallel with the other pairs.

14. The system of claim 13 wherein said silicon controlled rectifiers are regulated by a phase-locked loop controlling a firing pulse circuit.

15. A system exclusively for starting and regulating a wound rotor motor having a stator connected by a first AC bus to an AC power source comprising:

a shorting contactor having an input and an output, the input of which is connected to the rotor of the motor;

a voltage source inverter having an input and an output, the input of which is connected to the output of said shorting contactor;

a silicon controlled rectifier converter having two inputs and an output, the first input of which is connected to the rotor of the motor by a second AC bus and the output of which is connected to the output of said voltage source inverter;

a voltage source converter having an input and two outputs, the input of which is connected by a bidirectional constant voltage DC bus to the output of said voltage source inverter and the first output of which is connected to the first AC bus; and a linear phase ramp connected to the second input of said silicon controlled rectifier converter.

16. The system of claim 15 wherein said rectifier converter is further comprised of at least three pairs of components, each pair having a silicon controlled rectifier connected in series with another silicon controlled rectifier and each pair being connected in parallel with the other pairs.

17. The system of claim 15 wherein said rectifier converter is further comprised of at least three pairs of components, each pair having a silicon controlled rectifier connected in series with a diode and each pair being connected in parallel with the other pairs.

18. A method exclusively for starting mid regulating a wound rotor motor with an AC power source line using a drive circuit having both a voltage source converter with specified ratings, at least one output and an input connected to the output of a voltage source inverter with specified ratings wherein the first input of a silicon controlled rectifier converter having at least one silicon controlled rectifier is connected to the rotor of the motor and the output of the silicon controlled rectifier converter is connected to the output of the voltage source inverter and wherein further a shorting contactor is connected between the rotor of the motor and the input of the voltage source inverter and the gating of the at least one rectifier is adjustable, comprising:

supplying AC power to the stator of the motor;
delivering AC power generated by the rotor of the motor to the silicon controlled rectifier converter;
isolating the voltage source inverter by means of the shorting contactor until voltage is below a pre-specified level;
generating a phase angle control signal;
transmitting the phase angle control signal to the silicon controlled rectifier converter through a second input thereof;
adjusting the gating of the at least one silicon controlled rectifier in response to the phase angle control signal such that the output of the silicon controlled rectifier converter does not exceed the ratings of either the voltage source converter or the voltage source inverter; and
returning rotor power passed through to the voltage source converter back to the AC power source line.

* * * * *